UNITED STATES PATENT OFFICE.

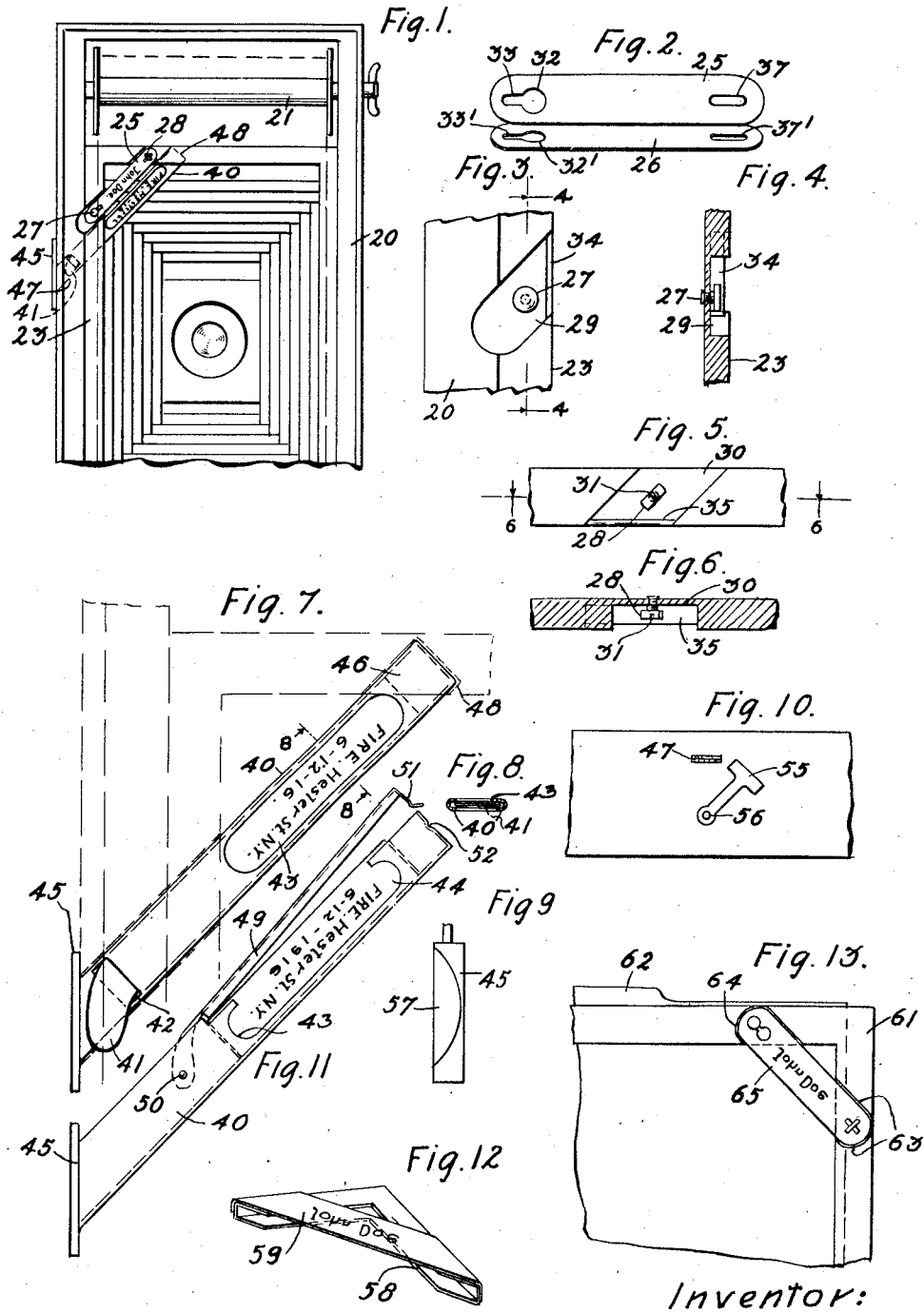

CHENG CHIH KUO, OF ITHACA, NEW YORK.

PHOTOGRAPHIC APPARATUS.

1,360,414.   Specification of Letters Patent.   Patented Nov. 30, 1920.

Application filed January 29, 1917. Serial No. 145,157.

*To all whom it may concern:*

Be it known that I, CHENG CHIH KUO, a citizen of the Republic of China, residing at Ithaca, in the county of Tompkins and State of New York, have invented certain new and useful Improvements in Photographic Apparatus, of which the following is a specification.

This invention relates to photographic apparatus and in particular to autographic attachments for making a record on a photographic negative at the time of exposure whereby such information as is desired may be preserved for future reference.

The invention consists broadly in placing a strip of transparent material, on which a record has been made, within the camera and in such a position with respect to the negative to be exposed that a photographic record is made on the negative by a portion of the light which is used for otherwise exposing the negative. This record having thus been permanently fixed in the negative it appears in proper form and location on each print made therefrom. In one form of the invention an attachment is provided whereby the transparent strip may be removed and replaced at any time, proper provision being at the same time made to prevent the fogging of the negatives as hereinafter described.

It has been proposed heretofore to make a record of certain data adjacent to a negative at or about the time of exposure of the negative. This record is made by direct writing or by using some form of duplicating paper in connection with a steel pen. There are certain disadvantages to this which I propose to overcome in my invention. One of the disadvantages is that the record is made on a portion of the film between exposures with the attendant danger of so cutting the film that the writing will be mutilated or may actually go with the wrong exposure or negative. Furthermore, it is necessary to repeat the writing each time and for each negative for which it is to be used. In my invention, however, the writing which is to be repeated on successive negatives is written but once and is then reproduced automatically on each succeeding negative, the result being that a facsimile reproduction of the record, such as a signature, is made. Not only does this save time but it insures the identity of the record made on each negative.

These results are accomplished, as hereinafter pointed out in detail, by the fact that the record on the negative is made photographically by the light which enters the camera lens to expose the negative. A further advantage which naturally comes from this method of making the record is that the intensity of the record is proportioned to the intensity of the exposure of the negative.

This invention will be better understood by reference to the following specification and accompanying drawing, in which Figure 1 is a rear view of a film camera, with the back removed and showing the parts required for the invention attached thereto. Figs. 2 to 9 show detail views of various parts of the device constituting this invention, Fig. 4 being a cross-sectional view taken on the line 4—4 of Fig. 3, Fig. 6 being a similar view taken on the line 6—6 of Fig. 5 and Fig. 8 being a similar view taken on the line 8—8 of Fig. 7. Fig. 10 is a side view of a roll film camera showing provisions for the attachment best shown in Fig. 7. Fig. 11 shows a modified form which the attachment of Fig. 7 may take. Fig. 12 is an attachment in accordance with my invention and which is particularly adapted for use with a film pack. Fig. 13 shows a form which my invention may take for use in connection with a plate holder.

Referring to Fig. 1, 20 is the main frame of the usual form of film camera, the removable back having been taken off thus exposing the film spool 21 and other parts of the interior of the camera box. In this case we are to consider ourselves as looking into the interior of the dark box from the rear and toward the back of the lens. 23 represents the border or mask for the negative, this mask constituting a part of or being secured to the frame 20. 25 is a strip of celluloid or other transparent material on which writing, printing or other forms of record may be placed. This member 25 is secured to the frame 20 in any suitable manner as indicated by the buttons 27 and 28 shown in enlarged detail in Figs. 3 to 6.

As shown in Figs. 3 and 4, a depression is made in the frame 23 and in this is rigidly secured a button 27, the head of which may be round, as shown in the plan view of this button in Fig. 3. The button 28 is shown in plan view in Fig. 5 and cross-section in Fig. 6. This button is shown as secured in a depression 30 and is adapted to rotate as a turn-button, for which purpose the slot 31 may be useful. The celluloid strip on which the record is to be made, and which is held in place by the buttons 27 and 28, is shown in Fig. 2. This strip is preferably made double, consisting of the portions 25 and 26, so that the writing which is made upon one of the portions may then be covered over by the other portion to keep the sliding film from erasing the written record. The strip has at one end two registering openings 32 and 32′ of the proper size to conveniently slip over the head of the button 27. Extending from these openings are the narrow slot 33 and 33′ into which the stem of the button 27 may pass. At the other end of the celluloid strip are the narrow, elongated and registering openings 37 and 37′ adapted to slip over the narrow head of the button 28, when said button is in the position indicated in Fig. 5, whereupon the said button may be turned into the position shown in Fig. 1.

The slots 29 and 30 are placed in such positions and at such an angle to the frame 20 that the strip 25 occupies a position over that portion of the negative on which it is desired to make a record. I have found it convenient to have it cut across one corner of the negative as shown in Fig. 1, but it is apparent that it may be arranged to cover any other portion desired. In order to hold the strip fairly close to the negative, but not so close as to cause scratching, the depressions 29 and 30 are supplied with the wall portions 34 and 35 and, also to avoid scratching, the buttons 27 and 28 are made sufficiently short so that their tops are at a lower level than the tops of the wall portions 34 and 35.

In general it will be desirable to place some special marking or record on each separate exposure. This would be impossible with the device thus far described, for having been once inserted the strip 25 cannot be removed until the complete film has been exposed. For this reason I provide a device in which the record to be made on the negative may be changed for each exposure. Such a device is shown in Fig. 1 at 40, and in further detail in Figs. 7 to 9. Referring particularly to Fig. 7, 40 represents a metal member carrying a removable celluloid strip 41 on which any desired record may be placed. This member 40, with its strip, may in turn be inserted into or removed from the camera with no danger of the negatives being light struck. The member 40 consists of a flat metal sleeve into which may be slipped the celluloid strip 41 by means of the slot 42. In order that light may reach the transparent strip the front and back of the sleeve are cut away as shown in Fig. 7 at 43. This is further shown by Fig. 8 which is a cross section on the line 8—8 of Fig. 7. At one end of the member 40 is placed a head piece 45 and this is preferably placed at an angle of about 45 degrees to the length of the member 40. This head piece 45 is also preferably broader than the thickness of the member 40, as shown in Fig. 9. A suitable slot 47 is made in one side of the camera as shown in Figs. 1 and 10 into which the member 40 may slide. This slot is at an angle corresponding to that which the headpiece 45 makes with the member 40. There is also a coöperating slot in another portion in the camera frame, as shown at 48 of Figs. 1 and 7, so positioned that it receives one end of the sleeve 40 when this member is inserted into the slot 47. The slot 47 should be lined with velvet or other similar material throughout a part or the whole of its length to prevent the entrance of extraneous light which might fog the negatives.

Although the strip 41 is shown as inserted into the sleeve 40 by means of the slot 42 it is apparent that this may be accomplished in other ways. The slot 42 may, for example, be omitted and the end 46 of the sleeve 40 may be left open in which case the strip may be inserted in the open end 46.

Still another method of inserting the celluloid strip into the sleeve 40 is shown in Fig. 11. In this figure the sleeve 40 has a portion cut away as indicated into which the strip 44 with its record may be placed. Secured to the sleeve 40 is the hinged member 49, the said member being hinged at the point 50 and being of such a shape as to cover the exposed edge of the celluloid strip 44. Preferably at the extreme end of the member 49 is the spring catch 51 which coöperates with the notch 52 of the sleeve 40 to hold the parts securely in position.

Any desired record may be placed on the strip 41 or 44 either before or after said strip has been inserted into the sleeve 40. Furthermore it is to be understood that the strip may be single in form or may be double as shown in Fig. 2. The sleeve, with its record, may be inserted in the slot 47 and be guided to its final position and may thereafter be removed whenever desired and the record changed in any manner suitable.

As pointed out in connection with element 25 of Fig. 2 the strips 41 and 44 may be of any suitable transparent or semi-transparent material on which writing, printing or other suitable records may be made either with ink or with some form of pencil. In general a black ink or a black pencil would be used but it is obvious that any color may be used which is opaque to the light effective for photographic work or which is more opaque to such light than the strip 41 or 44. It is to be understood, however, that this invention is not limited to such an arrangement, but may consist of any suitable arrangement of colors whereby the desired record is made on the negative at the time of exposure.

In Fig. 10 there is shown a shutter 55, pivoted at 56, which may be closed over the slot 47 when the member 40 is not in use and will thus reduce the possibilities of leakage of light or it may serve the additional function of holding the member 40 in place by fitting over and coöperating with the cut away portion 57 of the head piece 45.

In Fig. 12 there is shown a modification of my invention which is particularly adapted for use with film packs. The figure shows a structure 58 similar to the corner of a box, which structure is made of metal, cardboard or other suitable material. The dimensions of the frame are such as to fit snugly over the corner of a film pack. Across one corner is attached a strip 59 of celluloid or other suitable transparent material such as was described in connection with the elements 25 and 41 and 44 of Figs. 2 and 7 and 11. This strip may be secured to the frame or structure 58 in any convenient manner, as for example by gluing. Such a device can be made cheaply and would go with each pack of films. Thus any one possessing a film pack camera can convert it into an autographic camera without modifying the camera itself in any manner whatsoever, but by merely attaching such a device as shown in Fig. 12 to his film pack before mounting the same in his camera.

In Fig. 13 there is shown a further modification of my invention which is adapted for use in connection with a plate holder of the usual form. In this figure 61 represents the holder and 62 a slide. Across one corner of the frame is secured, in depressions 63 and 64 of the same form as those described in connection with Figs. 3 to 6, one or more strips 65 of a form similar to that described in connection with the element 25. These strips may be secured to the frame of the holder 61 in the same manner as indicated in connection with Figs. 2 to 6 although it is to be understood that my invention is not to be limited to this particular method of attaching the strips and that many variations may be made in the method of attaching, all for the purpose of attaining the advantages of this invention.

From the foregoing it will be apparent that this autographic attachment permits the writing of names or dates or other records automatically during the exposure for the picture, and that where the record is to be repeated on successive negatives it saves the time and trouble of making this record for each negative. Furthermore it is possible to locate this record at any desired place on the negative, such for example as one corner thereof, in which case it will be suitably and artistically located both for vertical and horizontal pictures. The attachment is, furthermore, easy to operate and requires but slight modification of the camera. It is obvious that the attachment, if desired, may be removed in which case the camera will operate in its usual manner in every respect. One of the chief merits of this attachment is, however, that it does not require any change in the sensitized elements to be used, whether these be roll films, film packs or plates.

Having now described my invention what I claim to be new and desire to secure by Letters Patent is:

1. In combination with a camera adapted to hold a sensitized element, an autographic attachment therefor comprising a strip of translucid material adapted to have a record made thereon, a translucent strip attached to said strip to cover the record and means whereby said strip may be slidably inserted into the camera in front of said sensitized element and within the field of exposure whereby, upon opening the camera lens, a record is simultaneously made on said element of the record on the strip and the object photographed.

2. In combination with means for holding a sensitized element for exposure, an autographic attachment therefor comprising a strip of translucid material adapted to have an inscription made thereon, and a sleeve slidably insertible into the holding means for supporting said strip immediately in front of said element and within the field of exposure whereby, upon exposure, a record is simultaneously made on said element of the inscription and the object photographed.

3. A photographic camera adapted to hold a sensitized element and having an autographic attachment adapted to be supported within the exposure field in front of the sensitized element and within the field of exposure and to be slidably inserted and removed, said strip having a portion to protect the record from rubbing contact with the adjacent parts and means for preventing the sensitized element from being light struck when the attachment is removed.

4. A photographic camera adapted to hold a sensitized element for exposure and having an autographic attachment slidably inserted in front of said sensitized element and within the field of exposure, said attachment including a translucid strip adapted to receive an inscription thereon whereby, upon exposure, a record is simultaneously made on said element of the inscription and the object photographed.

5. The combination of a photographic camera, adapted to have a sensitized element therein, and a removable autographic attachment, said autographic attachment comprising a strip of translucid material adapted to receive a record and a sleeve adapted to receive said strip, and having registering openings to expose the strip, said camera having a slot in one side into which said sleeve is adapted to slide, the slot being so positioned as to maintain said sleeve with its strip in a position immediately in front of said sensitized element and within the field of exposure whereby, upon exposure, a record is simultaneously made on said sensitized element of the record on said strip and the object photographed and means for covering the record for protecting it from rubbing contact.

6. The combination of a photographic camera, adapted to have a sensitized element or elements therein, and a removable autographic attachment, said autographic attachment comprising a strip of translucid material adapted to receive a record and a flattened sleeve adapted to receive the strip, said sleeve having portions of its flat sides cut away to expose parts of said strip, said camera having a slot in the side of its frame into which said sleeve is adapted to slide, the slot being so positioned as to hold the sleeve with its strip in a suitable position with respect to said sensitized element and within the field of exposure whereby, upon exposure, a record is simultaneously made on said element of the record on the strip and the object photographed.

7. The combination of a photographic camera, adapted to have a sensitized element therein, and a removable autographic attachment, said autographic attachment comprising a strip of translucid material adapted to receive a record and flattened sleeve adapted to receive the strip, said sleeve having portions of its flat sides cut away to expose parts of said strip, said camera having a slot in the side of its frame into which said sleeve is adapted to slide, the slot being so positioned as to hold the sleeve with its strip in a suitable position with respect to said sensitized element and within the field of exposure, whereby, upon exposure, a record is simultaneously made on said sensitized element of the record on said strip, and the object photographed, said slot being lined with material to prevent the fogging of the sensitized element when the sleeve is removed.

8. The combination of a photographic camera, adapted to have a sensitized element therein, and a removable autographic attachment, said autographic attachment comprising a strip of translucid material adapted to receive a record and a flattened sleeve adapted to receive said strip, said sleeve having portions of its flat sides cut away to expose parts of said strip, said camera having a slot in the side of its frame into which said sleeve is adapted to slide, the slot being so positioned as to hold the sleeve with its strip in a position immediately in front of the sensitized element and being lined with material to prevent the fogging of the sensitized element when the sleeve is removed and the sleeve having on its outer end a headpiece to cover said slot opening, all as and for the purpose set forth.

9. An autographic attachment for use with a sensitized element of photographic apparatus, said attachment comprising a translucent member for carrying a record to be inscribed, and means associated with said member for protecting the record from rubbing contact, said attachment also comprising means for supporting said translucent member, said means being adapted to slidably bring and to hold the translucent member in front of the sensitized element and within the field of exposure.

10. An autographic attachment for a camera comprising a translucent member for carrying a record to be inscribed and a second translucent member for protecting the record on the first member.

11. An autographic attachment for a camera comprising a translucent member for carrying a record to be inscribed and a second translucent member adapted to cover the record on said first member.

12. An autographic attachment for a camera comprising a translucent member for carrying a record to be inscribed and a second translucent member hinged to the first member and adapted to cover the record on said first member.

13. In combination with means for holding a sensitized element for exposure, an autographic attachment therefor comprising a translucent member adapted to have an inscription made on one portion thereof, a second translucent member for protecting the record on the first member, and means for removably holding said strip immediately in front of said element and within the field of exposure whereby upon exposure a record is simultaneously made on the said element of the inscription and the object photographed.

14. In combination with means for holding a sensitized element for exposure, an autographic attachment therefor comprising a double strip of translucent material adapted to have an inscription made on one portion thereof, and means for removably holding said strip immediately in front of said element and within the field of exposure whereby upon exposure a record is simultaneously made on said element of the inscription and the object photographed.

In witness whereof I hereunto subscribe my name this 19th day of January, A. D. 1917.

CHENG CHIH KUO.